United States Patent [19]

Webster

[11] 3,890,483

[45] June 17, 1975

[54] JOINTS FOR PROTECTIVELY LINED OR COATED METAL PIPE SECTIONS

[75] Inventor: John David Webster, Cornwall, England

[73] Assignee: English Clays Lovering Pochin & Company Limited, England

[22] Filed: Apr. 1, 1974

[21] Appl. No.: 457,144

[30] Foreign Application Priority Data
Apr. 6, 1973 United Kingdom............... 16747/73

[52] U.S. Cl. ...................... 219/92; 29/458; 219/104
[51] Int. Cl........................... B23k 9/00; B23k 11/00
[58] Field of Search ....... 219/137, 91, 92, 101, 104, 219/105, 117, 95, 97, 59, 60, 61, 67; 29/458, 500

[56] References Cited
UNITED STATES PATENTS

| | | | |
|---|---|---|---|
| 1,744,797 | 1/1930 | Pfeiffer | 219/91 |
| 2,188,925 | 2/1940 | Rouay | 219/137 X |
| 2,273,154 | 2/1942 | Stromsoe | 29/458 |
| 2,895,747 | 7/1959 | Blaud et al | 29/458 |
| 3,132,236 | 5/1964 | Deininger | 219/91 |
| 3,515,841 | 6/1970 | King | 219/91 |
| 3,735,088 | 5/1973 | Hall | 219/137 X |
| 3,798,406 | 3/1974 | Becker | 219/92 |

Primary Examiner—Bruce A. Reynolds
Attorney, Agent, or Firm—Larson, Taylor and Hinds

[57] ABSTRACT

A method of joining a first metallic pipe section having a coating of a heat-degradable material on one surface thereof, to a second metallic pipe section along abutting edges by forming a welded joint between the abutting metal edges of the metallic pipe sections is described. Before forming the welded joint there is inserted between the metallic pipe section and the coating along the edge thereof which is to be welded to the second pipe section a quantity of material which substantially prevents heat being transferred from the welded joint during the formation thereof to the coating.

8 Claims, 5 Drawing Figures

– 1 –
JOINTS FOR PROTECTIVELY LINED OR COATED METAL PIPE SECTIONS

BACKGROUND OF THE INVENTION

This invention relates to a method of joining together two metal pipe sections at least one and generally both of the pipe sections including a lining of a heat-degradable material such as a glass, a plastics material or a natural or synthetic rubber, for example nylon, polyethylene, polypropylene and polyurethane.

Hitherto, attempts to join together the ends of two sections of a metal pipe, both of which are lined with a heat-degradable material, e.g. a plastics material, by welding together the metal ends of the pipes have frequently resulted in destruction of the plastics material by the high welding temperatures normally involved.

SUMMARY OF THE INVENTION

According to the invention there is provided, in a method of joining a first metallic pipe section having a coating of a heat-degradable material on the inside thereof, to a second metallic pipe section along abutting edges by forming a welded joint between the abutting metal edges of the metallic pipe sections, the improvement which comprises before forming said welded joint inserting between the first metallic pipe section and the coating thereof along the edge which is to be welded to the second metallic pipe section a quantity of material which substantially prevents heat being transferred from the welded joint during the formation thereof to the coating.

In one embodiment, the invention provides, in a method of joining a first metallic pipe section having a coating of a heat-degradable material on the inside thereof, to a second metallic pipe section along abutting edges by forming a welded joint between the abutting metal edges of the metallic pipe sections, the steps of separating the first metallic pipe section from the coating thereof along the edge which is to be welded to the second metallic pipe section to form a cavity and inserting a further quantity of coating material in the cavity, which is formed between the first metallic pipe section and the coating, such that the heat generated during the welding together of the metal edges is absorbed by said further quantity of coating material thereby substantially preventing transfer of heat to the coating and destruction of the coating.

The quantity of further coating material inserted into the cavity formed between the first metallic pipe section and the coating may be sufficient to fill the cavity or it may be such as to leave an air gap between the metallic pipe section and the coating material. In the latter case the air gap also effectively acts as a thermal insulation layer which reduces the heat transfer from the welded joint to the coating material. In places where high welding temperatures are used it may be advantageous to insert into the air gap a fillet of thermal insulation material, e.g. fiberglass, asbestos, ceramics, glass ceramics or refractory materials, or mixtures of such materials.

Instead of using surplus coating material there can be employed simply a fillet of thermal insulation material. The fillet of insulating material can be inserted between the first metallic pipe section and the coating, the metallic pipe section being swaged out slightly to accommodate the fillet, or sufficient of the coating adjacent the metallic pipe section may be removed to accommodate the fillet without necessitating the swaging out of the metallic pipe section.

In the case where the portion of the metallic pipe section adjacent the edge to be welded is separated, e.g. bent away, from the coating to accommodate the surplus coating material and optionally an air gap and/or a fillet of insulation material it is found that there can be produced an angle between the edges of the metal to be welded which approaches closely the optimum angle required between two metal edges for welding purposes (which is generally of the order of 70°), and in this way the amount of metal edge grinding required to produce the required edge-to-edge welding angle is reduced.

In the case where a further quantity of coating material is inserted between the metallic pipe section and the coating it may be convenient to arrange for those faces of the coating material which are brought into contact when two pipe sections are joined in an edge-to-edge fashion to be shaped such that one face can be co-operatively engaged with the other face; for example, typical male/female spigot joints may be used. Such a locating, or coupling, arrangement enables there to be achieved an accurate alignment of the metal edges to each other for welding purposes and it also enables there to be obtained a more accurate alignment of the edge faces of the coating material to each other. The shaping of the male/female joint members can be such (for example by arranging for the slopes of the sides of the co-operating joint members to be of different values) that once the metal edges are welded together the coupling or joint between the surplus protective material will not only provide a self-locating and self-alignment joint but will also provide a seal. For example, where two metallic pipe sections are joined together the coupling or joint between the further quantities of coating material of each metallic pipe section can provide not only a seal between the further quantity of coating material, and therefore prevent matter carried by the pipe from contacting the metal joint, but also it can serve more accurately to align the edges of the coating.

Where two lined pipes are to be joined end to end by the method of the invention it is desirable to employ a clamping mechanism, or jig, to bring the two pipes in correct co-operative alignment as between the abutting faces of the metal layers, the abutting faces of the quantities of further coating material, and the abutting faces of the coatings themselves, and moreover to ensure that during the welding operation an axial compression is exerted on the plane of contact between the above three pairs of co-operating faces. This compression ensures a more effective welding of the metallic pipe sections, a more effective contacting (and interlocking of the faces of the additional coating material, and a good sealing contact between the end faces of the coating. It is desirable that the compression between the contacting end faces of the coating is created by the clamping mechanism applying a uniform circumferential pressure to the coating thereby producing a contact joint between the end faces of the coating which is similar in sealing effectiveness to that produced by a normal bolted flange or flange/clamping ring system for securing together pipe sections.

The methods of the invention enable there to be produced a contact joint between the edges of the protective lining of two sections of lined metal pipe sections such that the protective lining of the resulting length of pipe retains the same bore over the joint area of the lining surface as that of the bore of the individual lined pipe sections. The method of invention can be applied, for example, to the joining together of metallic pipe sections made of weldable metal whatever the method of welding normally employed, e.g. low, high or normal temperature welding techniques, e.g. steels, aluminium, and aluminium alloys etc. The methods of the invention can also be used for welding any first metallic pipe section and one or more coatings of heat-degradable material to a second pipe section formed from a metal which can be welded to the metal of the first pipe section. In other words, the method of the invention is not limited to the welding together of two similar pipe sections having the same or similar structure but it can be used, for example, for the welding of a plastics-lined steel pipe to an unlined steel pipe. There can be welded together metallic pipes having typical thicknesses of, for example, ¼ inch thick mild steel, and having linings of, for example, polyurethane which is ¼ inch thickness. Thicker metallic pipe sections although requiring more heat for the welding operation have a greater mass of metal to conduct away the heat from the welding zone and the "welding time/-heat generated" factor is to some degree self compensating. There is however for any metal used a minimum thickness, appropriate to the welding temperature used, below which the rate of heating conduction by the metal away from the lining material is too low to avoid destruction of the protective lining.

For a better understanding of the invention reference will now be made, by way of example, to the accompanying drawings in which:

FIGS. 1 to 5 show longitudinal sections of five embodiments of pipe sections joined together by the method of the invention, each figure being a longitudinal quarter section through one wall of two polyurethane-lined pipe sections welded together end-to-end.

In FIG. 1 two pipe sections each comprising a steel metallic pipe section 1 and a layer of polyurethane lining 2 are provided with flared out bell-shaped end portions 3. Further quantities of the polyurethane lining have been inserted into the end portions 3 so that the thickness of polyurethane is greater in the bell-shaped portions whilst the inner surface of the polyurethane lining is parallel to the longitudinal axis of the pipe sections. The two pipe sections are welded together at 4 and accurate alignment of the pipe sections is facilitated by the interengagement of a male portion 6, which is formed in the polyurethane lining of one pipe section, and a female portion 7 which is formed in the polyurethane lining of the other pipe section. The joint 5 between the polyurethane linings of the two pipes may be sealed by means of a suitable adhesive which can be cured at ambient temperature or at the temperature prevailing at the joint as a result of the welding operation.

Figure 1:
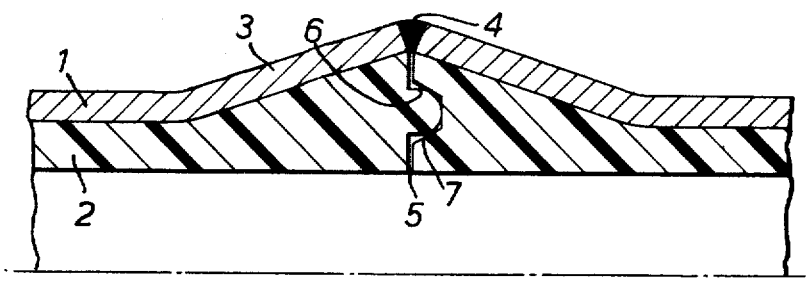
Figure 2:
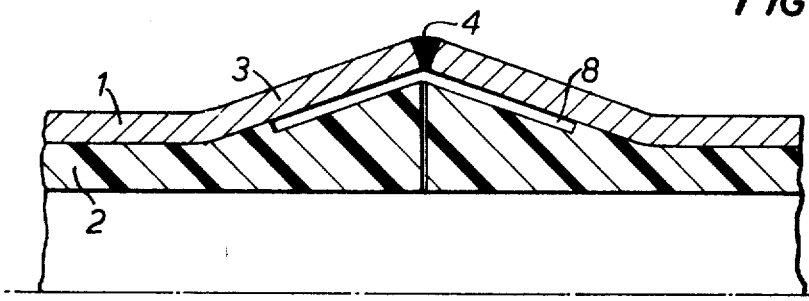
FIG. 2 shows a similar arrangement of two pipe sections except that an air space 8 is provided near the joint between the two pipes.
Figure 3:
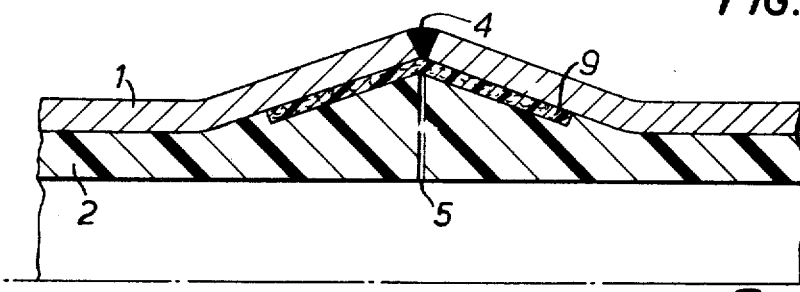
FIG. 3 shows a similar arrangement in which a fillet of fibreglass insulation material 9 is inserted in the air space.
Figure 4:
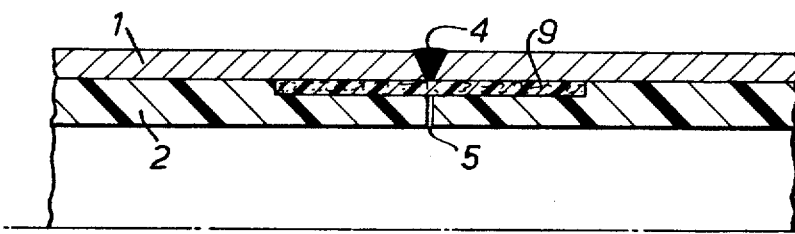
FIG. 4 shows a welded joint between two pipe sections which have not been provided with bell-shaped end portions but where an annular portion of the polyurethane lining has been cut away to separate the metallic pipe section and the coating and to accommodate a fillet of fibreglass insulation material 9. The inner surface of the polyurethane lining is smooth.
Figure 5:
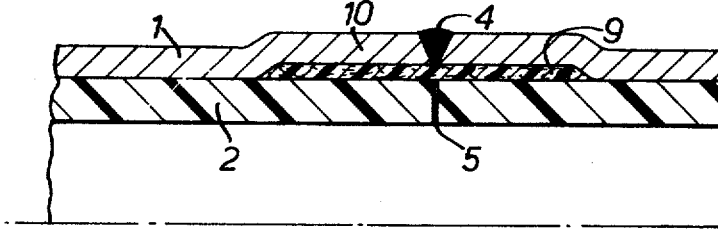
FIG. 5 shows an arrangement similar to that of FIG. 4 in which the ends of the pipe sections are swaged out slightly to accommodate the fillet of insulation material, the swaged out portions being indicated at 10.

I claim:

1. In a method of joining a first metallic pipe section having a coating of a heat-degradable material on the inside thereof and a second metallic pipe section along abutting metal edges by forming a welded joint between the abutting metal edges of the metallic pipe sections, the improvement which comprises before forming said welded joint inserting between the first metallic pipe section and the coating on the inside thereof along the edge which is to be welded to the second metallic pipe section a quantity of material which substantially prevents heat being transferred from the welded joint, during the formation thereof, to the coating in an amount sufficient to cause degration of the coating.

2. A method according to claim 1, wherein said second metallic pipe section has a coating of heat-degradable material on the inside thereof and wherein, before forming said welded joint, there is inserted between the second metallic pipe section and the coating on the inside thereof along the edge which is to be welded to the first metallic pipe section a quantity of material which substantially prevents heat being transferred from the welded joint, during the formation thereof, to the coating, in an amount sufficient to cause degration of the coating.

3. A method according to claim 2, wherein said heat-degradable material is a plastics material.

4. A method according to claim 1, wherein a fillet of a heat-insulating material is inserted between the metallic pipe section and said coating along that edge thereof which is to be joined to the other pipe section.

5. In a method of joining a first metallic pipe section having a coating of a heat-degradable material on the inside thereof and a second metallic pipe section along abutting metal edges by forming a welded joint between the abutting metal edges of the metallic pipe sections, the improvement which comprises, before forming said welded joint, the steps of (a) separating the first metallic pipe section and the coating on the inside thereof along the edge which is to be welded to the second metallic pipe section to form a cavity, and (b) inserting a further quantity of coating material in said cavity such that a sufficient amount of the heat generated during the welding together of the metal edges of said metallic pipe sections is absorbed by said further quantity of coating material to prevent the transfer of such heat to the coating in an amount sufficient to cause destruction of the coating.

6. A method according to claim 5, wherein said second metallic pipe section has a coating of heat-degradable material on the inside thereof and wherein, before forming said welded joint, there are carried out the steps of (a) separating the second metallic pipe section and the coating on the inside thereof along the edge which is to be welded to the first metallic pipe section to form a cavity and (b) inserting a further quantity of coating material in said cavity such that a sufficient amount of the heat generated during the welding together of the metal edges of said metallic pipe sections is absorbed by said further quantity of coating material to prevent transfer of such heat to the coating in an amount sufficient to cause destruction of the coating.

7. A method according to claim 6, wherein said heat-degradable material is a plastics material.

8. A method according to claim 5, wherein a fillet of heat-insulating material is inserted in said cavity between the metallic pipe section and said further quantity of coating material.

* * * * *